(12) United States Patent
Melton et al.

(10) Patent No.: US 7,259,538 B2
(45) Date of Patent: Aug. 21, 2007

(54) ADAPTIVE BATTERY CONDITIONING EMPLOYING BATTERY CHEMISTRY DETERMINATION

(75) Inventors: Gerod Melton, Fort Collins, CO (US); Heather N. Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 10/295,107

(22) Filed: Nov. 14, 2002

(65) Prior Publication Data
US 2004/0095096 A1    May 20, 2004

(51) Int. Cl.
*H01M 10/44* (2006.01)
*H01M 10/46* (2006.01)

(52) U.S. Cl. .................................. 320/106
(58) Field of Classification Search ........... 320/110, 320/132, 136, 124, 125, 127, 106; 324/425, 324/426, 432, 438
See application file for complete search history.

(56) References Cited

U.S. PATENT DOCUMENTS

| | | | | |
|---|---|---|---|---|
| 4,577,144 A | * | 3/1986 | Hodgman et al. | 320/106 |
| 4,734,635 A | | 3/1988 | Theobald | 320/114 |
| 5,164,652 A | * | 11/1992 | Johnson et al. | 320/106 |
| 5,640,078 A | * | 6/1997 | Kou et al. | 320/124 |
| 5,714,866 A | * | 2/1998 | S et al. | 320/152 |
| 5,870,685 A | * | 2/1999 | Flynn | 455/573 |
| 5,982,146 A | | 11/1999 | Nguyen | 320/131 |
| 5,983,137 A | * | 11/1999 | Yerkovich | 607/5 |
| 6,037,751 A | * | 3/2000 | Klang | 320/160 |
| 6,137,261 A | * | 10/2000 | Kurle et al. | 320/132 |
| 6,215,312 B1 | * | 4/2001 | Hoenig et al. | 324/427 |
| 6,239,578 B1 | * | 5/2001 | Schnell et al. | 320/119 |
| 6,329,822 B1 | * | 12/2001 | Powers | 324/426 |
| 6,400,123 B1 | * | 6/2002 | Bean et al. | 320/132 |
| 6,433,511 B1 | * | 8/2002 | Bohne | 320/131 |
| 6,479,962 B2 | * | 11/2002 | Ziemkowski et al. | 320/106 |
| 6,545,448 B1 | * | 4/2003 | Stanley et al. | 320/132 |
| 6,618,644 B2 | * | 9/2003 | Bean | 700/231 |
| 6,737,830 B2 | * | 5/2004 | Bean et al. | 320/125 |
| 2003/0189418 A1 | * | 10/2003 | Schinner | 320/136 |

FOREIGN PATENT DOCUMENTS

JP    1257034    * 11/2002

OTHER PUBLICATIONS http://www.maxim-ic.com/quick_view2.cfm?qv_pk=2115, http://pdfserv.maxim-ic.com/en/ds/MAX1667.pdf.*
ECN, http://www.ecnmag.com/article/CA43715.html, Mar. 1, 2000.*

* cited by examiner

*Primary Examiner*—Edward H Tso

(57) ABSTRACT

Adaptive battery conditioning employs battery chemistry determination to establish how, when and whether to condition a battery. As a result, the conditioning is optimized for the determined battery chemistry. Further, conditioning of a battery that is not conditionable, such as a nonrechargeable battery, is prevented. A device determines battery chemistry in situ from a measurement of a characteristic of an installed battery, and conditions the installed battery in situ. The device can be a battery-powered consumer electronic device or a battery charging and conditioning system that is independent of an electronic device that uses the conditioned battery. A method of adaptive battery conditioning includes determining a chemistry of a battery from a measurement of a battery characteristic, and conditioning the battery according to the determined battery chemistry.

37 Claims, 4 Drawing Sheets

ADAPTIVE BATTERY CONDITIONING EMPLOYING BATTERY CHEMISTRY DETERMINATION

TECHNICAL FIELD

The invention relates to battery-powered devices. In particular, the invention relates to conditioning rechargeable batteries used with battery-powered devices.

BACKGROUND OF THE INVENTION

Battery-powered devices, such as digital cameras for example, generally depend on a battery-based power supply for their operational power. In particular, a battery-based power supply that employs a rechargeable battery is often used in such portable battery-powered devices. The rechargeable battery of the battery-based power supply provides the device with operational power without requiring a continuous connection to a fixed power source, such as an alternating current (AC) electrical outlet, thus facilitating portable operation of the device. In general, the device may be operated from battery power until the battery becomes depleted. When depleted, the battery is either recharged in situ or is replaced with a fully charged, replacement battery. When not recharged in situ, the rechargeable battery is typically recharged in a recharging unit that is separate from the device.

Modern battery-powered devices often are capable of accepting and utilizing batteries having any one of a number of different battery chemistries. In simple terms, a battery is a device that converts chemical energy stored by the battery into electrical energy or electricity. The 'chemistry' of the battery refers to a specific combination of electrolytes and electrode materials used in the battery to create and sustain chemical reactions within the battery that produce electricity. A variety of different battery chemistries are currently commercially available including, but not limited to, alkaline, high-energy alkaline, nickel-metal hydride (NiMH), nickel-cadmium (NiCd), and photo lithium or lithium-iron sulfide (Li—$FeS_2$). Moreover, all of these chemistries are available in a variety of common battery sizes or form factors, including, but not limited to, an 'AA' size.

Among the batteries that are used in battery-powered devices, some are rechargeable while others are not. In general, whether or not a battery is rechargeable is dictated by the battery chemistry. Thus, a battery having a battery chemistry that supports re-energizing or recharging of the chemical energy stored by the battery is usually considered to be rechargeable. For example, alkaline batteries generally are not rechargeable while NiMH and NiCd batteries are rechargeable.

Of the various rechargeable battery chemistries, many often require conditioning or reconditioning to achieve or maintain peak battery capacity and performance. For example, NiMH and NiCd batteries are know to require such conditioning. Without periodic conditioning during use, NiMH and NiCd batteries develop a reduced battery charge or storage capacity. The reduced charge capacity eventually renders the battery unusable. Regular, periodic battery conditioning of NiMH and NiCd batteries helps to reduce or even reverse the reduction of charge capacity. Additionally, batteries of certain chemistries often require conditioning when new and/or after being stored for a long period of time. For example, NiMH batteries typically require some conditioning to achieve a full capacity when new. On the other hand, batteries of some other chemistries do not require or benefit from conditioning. In fact, some battery chemistries may be damaged by the application of conditioning. Most notably, a non-rechargeable battery, such as an alkaline battery, would be drained and effectively rendered useless by an attempt to recondition such a battery.

Accordingly, it would be advantageous to have means for battery conditioning that was not limited to use with a battery having a particular battery chemistry. Such a battery conditioning means would address a long-standing need in the area of battery-powered devices that utilize rechargeable batteries.

SUMMARY OF THE INVENTION

The present invention provides battery conditioning for a rechargeable battery. In particular, the battery is conditioned or reconditioned based on a determined battery chemistry of the battery. Determination of battery chemistry enables the battery to be conditioned in a manner that is adapted to or optimized for the determined chemistry. Battery conditioning based on the determined battery chemistry is particularly useful when applied to in situ conditioning of batteries used in devices that accept and employ batteries having any one chemistry of a number of different battery chemistries. As such, the present invention is applicable to virtually any electronic device that utilizes a battery having a chemistry selected from multiple battery chemistries including, but not limited to, a digital camera, a laptop computer, a compact disk (CD) player, an electronic toy, and a cellular telephone.

In an aspect of the invention, a method of adaptively conditioning a battery is provided. The method of adaptively conditioning comprises determining a chemistry of the battery from a characteristic of the battery that is measured. The method of adaptively conditioning further comprises conditioning the battery according to the determined chemistry.

In another aspect of the invention, a device having in situ battery chemistry-adapted battery conditioning is provided. The device comprises means for determining a chemistry for a battery installed in the device. The chemistry determining means measures a characteristic of the installed battery to determine the battery chemistry. The device further comprises means for conditioning the installed battery. The conditioning means adapts to the determined battery chemistry before conditioning.

In yet another aspect of the invention, an electronic device with in situ adaptive battery conditioning is provided. The electronic device accepts any one of a plurality of battery chemistries. The electronic device comprises means for determining a battery chemistry of a battery installed in the device. The determining means uses a measured characteristic of the installed battery to determine the battery chemistry. The electronic device further comprises means for conditioning the installed battery. The conditioning means adapt to the determined battery chemistry before conditioning. In yet other aspects of the present invention, a battery charging and conditioning system that uses battery chemistry determination is provided.

Advantageously, the present invention employs battery chemistry determination to adapt battery conditioning to the determined chemistry. For example, the present invention determines whether the battery is rechargeable or not and what rechargeable chemistry is employed to adapt a particular conditioning regime to the determined battery chemistry. If the determined battery chemistry is nonrechargeable, the present invention does not attempt to condition the battery. Moreover, the adapted conditioning of the present invention does not depend on either an input from a user of the device or a priori known information regarding the battery chemistry, such as may be provided by a 'smart battery'. Certain embodiments of the present invention have other advantages in addition to and in lieu of the advantages described hereinabove. These and other features and advantages of the invention are detailed below with reference to the following drawings.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Figure 1:
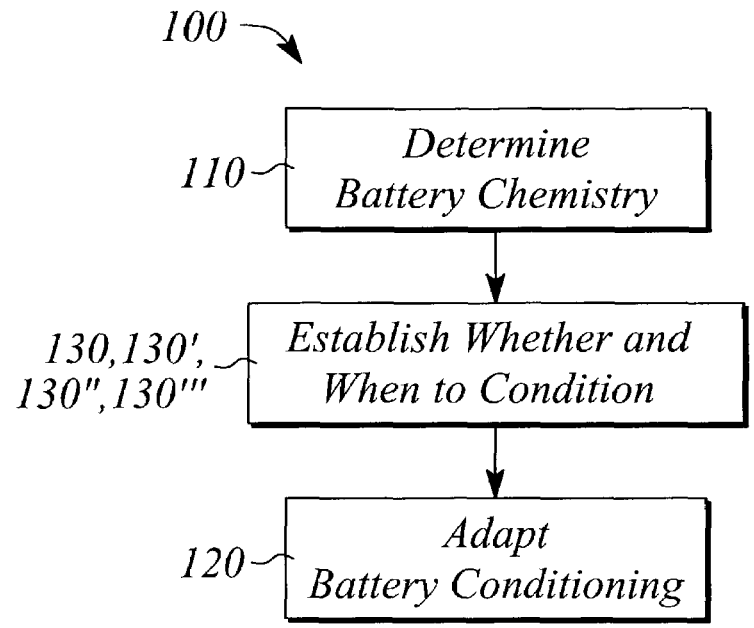
FIG. 1 illustrates a flow chart of an embodiment of a method of adaptively conditioning a battery based on battery chemistry determination according to the present invention.

FIG. 1 illustrates a flow chart of an embodiment of a method 100 of adaptively conditioning a battery based on battery chemistry determination according to the present invention. The method 100 of adaptively conditioning applies to conditioning or reconditioning a rechargeable battery, wherein the conditioning helps to establish or maintain a peak or optimum charge capacity of the battery or a nearly peak or optimum charge capacity of the battery. As used herein, a 'peak' or 'optimum' charge capacity is a primary charge capacity or a maximum charge capacity of the battery when the battery is new and fully conditioned (i.e., unused) or nearly new (i.e., hardly used). The method 100 of adaptively conditioning may be performed as an in situ conditioning of a battery installed in an electronic device or may be performed on a battery that is removed from the device and placed in an external conditioning unit or system for conditioning. The battery chemistry determination of the method 100 enables the conditioning of the battery to be adapted to the determined chemistry, thereby facilitating an optimum conditioning of the battery.

The method 100 of battery conditioning comprises determining 110 a chemistry of the battery. Determining 110 battery chemistry comprises measuring a characteristic of the battery and from the measured characteristic, determining the battery chemistry. In particular, a characteristic or a set of characteristics for the battery is measured preferably under one or more battery load conditions. In some embodiments, the measurements are performed in situ and can be performed using conventional battery monitoring circuitry of the electronic device. Results of the measurement are compared to 'known' or predetermined characteristics for a set of battery chemistries that may be used by the device. From the comparison, a determination 110 of battery chemistry is made. In some embodiments, the comparison uses a look-up table that stores the characteristics of candidate battery chemistry characteristics.

Ideally, the battery chemistry needs to be determined only when the battery has been replaced. However, in practice, determining 110 preferably is performed during each power-up or 'boot' sequence carried out by the electronic device. In addition, for electronic devices that can remain operational while the battery is replaced, determining 110 is preferably performed each time the battery is replaced or for example, a battery compartment is opened or accessed. Battery chemistry determination 110 also may be performed at other times during device operation and still be within the scope of the present invention.

Figure 2:
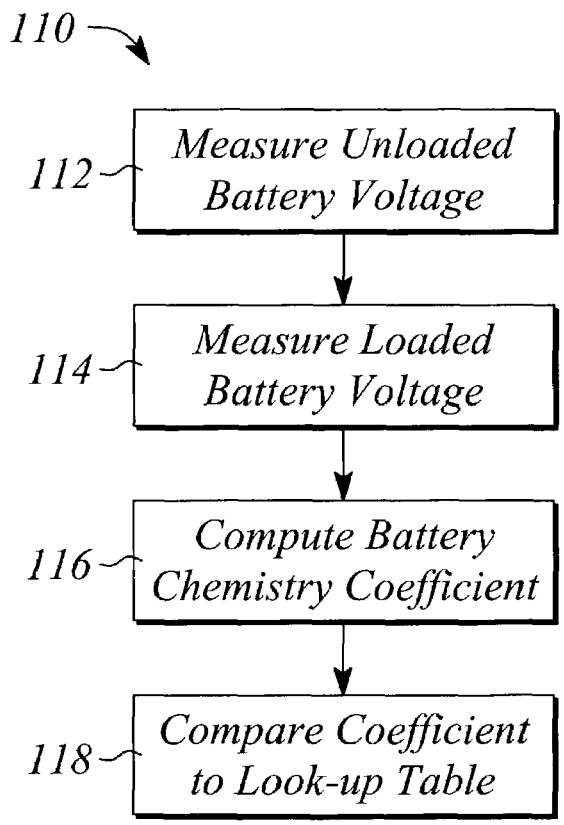
FIG. 2 illustrates a flow chart of an embodiment of determining a battery chemistry of a battery in the method of adaptively conditioning of FIG. 1 according to the present invention.

There is a variety of ways to determine 110 battery chemistry, all of which are within the scope of the present invention. A flow chart of an embodiment of determining 110 a battery chemistry of a battery in the method 100 of the present invention is illustrated in FIG. 2. In the illustrated embodiment, determining 110 comprises measuring 112 a battery voltage in an 'unloaded' or idle condition to produce a measured unloaded battery voltage value. Determining 110 further comprises measuring 114 the battery voltage in a 'loaded' condition to produce a measured loaded battery voltage value. An unloaded condition is defined as a situation wherein the battery is subjected to a low current drain while a loaded condition is defined as a situation wherein the battery is subjected to a relatively moderate to high current drain. Alternatively, a voltage that is proportional to the battery voltage may be measured 112, 114 instead of the actual voltage of the battery itself.

According to FIG. 2, determining 110 further comprises computing 116 a battery chemistry coefficient from the measured values of the loaded and unloaded battery voltages. One such battery chemistry coefficient is computed by taking a ratio of the measured 112, 114 values of the unloaded and loaded battery voltage. For example, the ratio may be the measured 112 unloaded value over the measured 114 loaded value. One skilled in the art can readily devise other useful battery chemistry coefficients all of which are within the scope of the present invention. The main function of the battery chemistry coefficient is to provide a reliable means for distinguishing between various battery chemistries.

The embodiment of determining 110 further comprises comparing 118 the battery chemistry coefficient to a set of candidate battery chemistry coefficients or preferably, to a set of battery chemistry coefficient ranges, for candidate battery chemistries. Preferably, the coefficient ranges are stored in a look-up table. The comparison 118 results in a choice of a particular battery chemistry from among the possible candidate battery chemistries represented by the coefficient ranges in the look-up table. In essence, comparing 118 produces a 'best guess' of an actual battery chemistry, the accuracy of which is limited only by an effective discrimination power or capability of the battery chemistry coefficient and an accuracy and applicability of look-up table data.

While defined hereinabove, the actual definition of the unloaded condition and the loaded condition of the battery is usually device specific. As already mentioned, the unloaded condition should represent a lower load or current drain on the battery than is evident in or represented by the loaded condition. Preferably, a relative difference in battery load levels between the loaded and unloaded conditions is relatively high. More preferably, the relative difference in load levels is as high as is normally experienced by the battery during normal device operation.

For example, if the device is a digital camera, an unloaded condition might be the load experienced by the battery before or immediately following a start-up process. A loaded condition might be defined as the load condition experienced by the battery during a lens extension or while charging a capacitor that powers the flash bulb. In another example, a loaded condition for a compact disk (CD) player might be defined to occur when 'spinning up' the CD. Moreover, the unloaded condition for the CD player might be defined as occurring when the CD is not spinning, but the player is ON. In general, any two relatively repeatable but different load conditions normally present in the device can be used as the loaded and unloaded conditions. However in general, the greater the difference in load levels, the more reliable will be the results of determining 110.

Given that the definitions of unloaded and loaded conditions are device specific, the coefficient ranges in the look-up table are likewise device specific. Typically, it is preferred that the look-up table coefficient ranges be generated empirically. That is, preferably the look-up table coefficient ranges are generated for the specific loaded and unloaded conditions to which the battery is subjected in the device. This way, the subsequent application of determining 110 battery chemistry results in an accurate determination of battery chemistry. One skilled in the art is familiar with the construction and use of this sort of empirically derived look-up table for an electronic device.

As mentioned hereinabove, other methods beyond that described hereinabove for determining battery chemistry are applicable to determining 110 battery chemistry of the method 100 of the present invention. For example, Bean et al., U.S. Pat. No. 6,215,275, incorporated herein by reference, discloses a method of battery chemistry determination or identification that utilizes a simple test circuit in conjunction with a microcontroller that measures several distinct voltages across a battery to determine battery chemistry. In another example, Bean et al., U.S. Pat. No. 6,404,164, incorporated herein by reference, disclose several in situ measurements of battery voltages under various loaded and unloaded battery conditions for battery chemistry determination. The described and cited methods, as well as any other method that one skilled in the art might devise to determine battery chemistry of a battery, are within the scope of the present invention.

The method 100 of adaptively conditioning further comprises conditioning 120 the battery according to the determined 110 battery chemistry. The terms 'conditioning' and 'reconditioning' refer to any procedure that may be applied to a rechargeable battery that helps to establish and/or maintain a peak or optimal charge capacity for the battery. For example, given a battery having a NiCd chemistry, conditioning 120 may be used to return a charge capacity of the battery to that of a nearly new NiCd battery (i.e., a primary charge capacity). In another example, a battery having a NiMH chemistry may be conditioned 120 when new or after having been stored for an extend period of time to help establish a peak charge capacity (i.e., a maximum charge capacity). One skilled in the art is familiar with conditioning batteries of particular battery types or chemistries, all such conditioning protocols are within the scope of the present invention.

An embodiment of battery conditioning 120, which applies to NiMH and NiCd batteries for example, comprises discharging the battery and then charging the battery. Preferably, the battery is discharged to a charge level beyond a normal operational 'cut-off' charge level for a given or intended use of the battery. In particular, the battery is preferably discharged without over discharging to an 'end-of-discharge' condition. The end-of-discharge condition depends on a given battery chemistry and therefore, is specific to or appropriate for the given battery chemistry. Therefore, the present invention is not intended to be limited to any particular 'end-of-discharge' condition. One skilled in the art is familiar with determining such an end-of-discharge condition for a given battery chemistry and may readily determine whether a battery is being over discharged without undue experimentation.

The battery is then charged to a level near a maximum charge level or capacity of the battery. As such, 'discharging' in the context of battery conditioning 120 generally is referred to as 'deeply discharging' indicating that the discharging reduces the battery charge level to below, preferably well below, the normal cut-off charge level. Similarly, 'charging' in the battery conditioning 120 context is often referred to as 'fully charging' since an attempt generally is made to achieve a maximum charge capacity of the battery. Since charging the battery is specific to and dependent on a given battery chemistry, the present invention is not intended to be limited to any particular 'charging' or 'fully charging' condition. One skilled in the art is familiar with and may readily determine the meaning of 'deeply discharging' and 'fully charging' with respect to a given battery chemistry for the purposes of battery conditioning without undue experimentation.

Preferably, discharging the battery is performed using a low discharge rate. Several cycles of such discharging may be applied during a particular battery conditioning 120. The low discharge rate may be achieved by applying a light, low or small load to the battery during a discharge period. The application of the small load results in a low rate of energy discharge or a low energy drain from the battery. For example, the small load may comprise using a 'low power' mode of the device in which the battery is installed and preferably, is conditioned 120 in situ. Alternatively, connecting a relatively high value resistor (e.g., 1K to 1M ohm) across terminals of the battery during the discharge period may be used as the small load or a moderately small load. In general, the definition of what constitutes a small load to a moderately small load depends, in part, on an overall capacity of the battery. However, one skilled in the art is familiar with and can readily determine a small to moderately small load for a given battery and battery capacity without undue experimentation.

The method 100 of adaptively conditioning a battery may further comprise establishing 130 whether and when to condition the battery. In some embodiments, establishing 130 is performed after determining 110 battery chemistry but before conditioning 120, as illustrated in FIG. 1. In general as describe hereinabove, determining 110 battery chemistry need only be performed once for each newly installed battery. On the other hand, establishing 130 when and whether to condition may occur many times for a given installed battery. In other embodiments (not illustrated), establishing 130 whether and when to condition is performed before determining 110 battery chemistry.

In some embodiments, conditioning 120 may be performed each time the battery is close to being fully discharged or nearly drained, or an end of the battery discharge cycle is near. In other words, at most a nominal amount of stored energy remains in the battery when the battery is close to being fully discharged or nearly drained. As used herein, 'a nominal amount of stored energy remaining' is equivalent to the 'end-of-discharge' condition described above.

In general, conditioning 120 does not take a long period of time, especially when the battery is nearly drained already. The period of time for conditioning 120 typically is battery chemistry specific, and not intended to limit the scope of the present invention. Thus in some embodiments, conditioning 120 comprises discharging or draining a remainder of stored energy in the battery before the battery is recharged. In such embodiments, establishing 130 whether and when to condition may comprise simply noting that the battery is nearly discharged (or has only a nominal amount of stored energy remaining) and is about to be recharged.

Figure 3A:
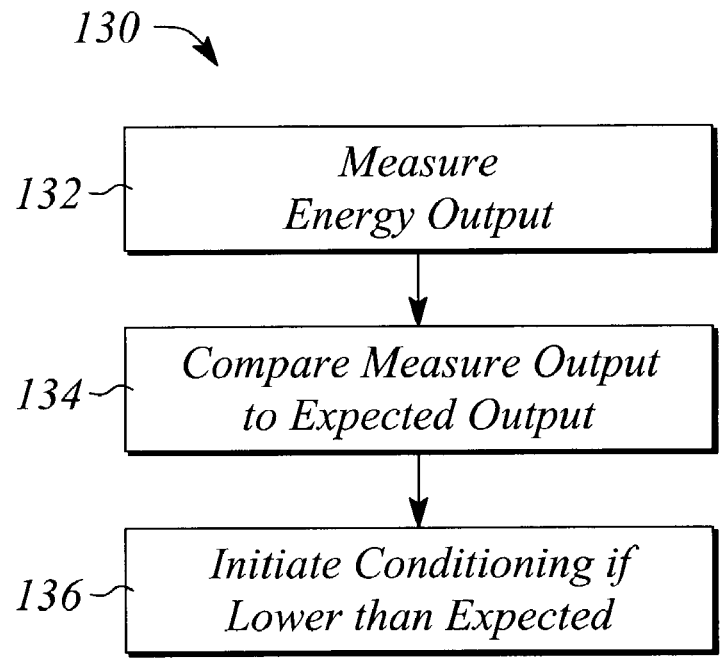
FIG. 3A illustrates a flow chart of an embodiment of establishing when and whether to condition a battery in the method of adaptively conditioning of FIG. 1 according to the present invention.

In other embodiments, an energy output of the battery may be monitored during the battery's use in the device. If a lower than expected energy output is detected, conditioning 120 may be indicated. A flow chart of an embodiment of establishing 130 when and whether to condition a battery in the method 100 is illustrated in FIG. 3A. In such an embodiment, establishing 130 uses energy monitoring and comprises measuring 132 the energy output of the battery during an operational use of the battery. Establishing 130 further comprises comparing 134 the measured energy output to an expected energy output. Establishing 130 further comprises initiating 136 conditioning 120 when a lower than expected result is encountered. For example, a software flag in a control program of the device may be set to establish 130 whether and when to condition the battery when the measured 132 energy output of the battery is less than expected. Setting of the software flag causes conditioning 120 to occur automatically a next time that the device is connected to a charging source to recharge the battery.

Figure 3B:
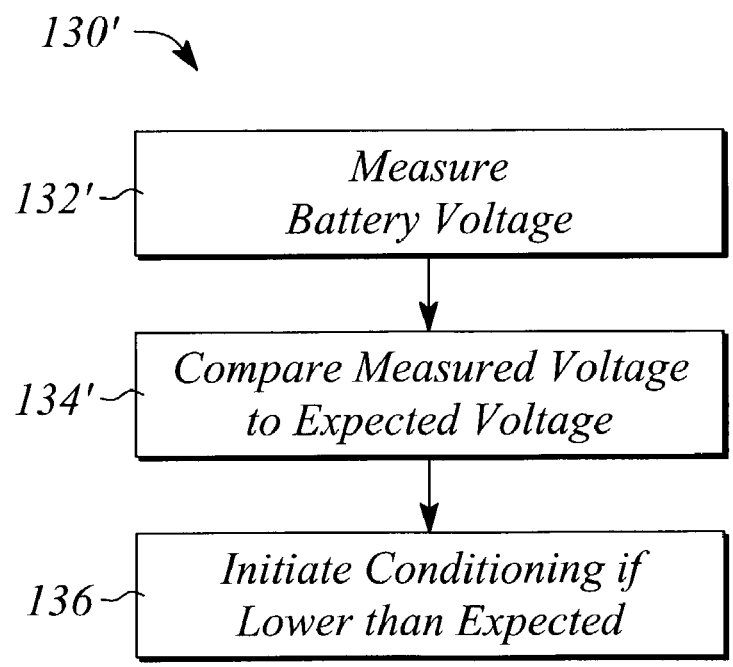
FIG. 3B illustrates a flow chart of another embodiment of establishing when and whether to condition a battery in the method of adaptively conditioning of FIG. 1 according to the present invention.

In other embodiments, a battery voltage may be monitored and measured during charging and/or discharging of the battery. For example during charging, if the battery fails to charge to a voltage indicating a 'full' battery, or fails to reach the voltage indicating a fully charged battery quickly enough, conditioning 120 of the battery may be indicated. FIG. 3B illustrates a flow chart of an embodiment of establishing 130' when and whether to condition a battery in the method 100 according to the present invention, which employs battery voltage measurement. In such embodiments, establishing 130' comprises measuring 132' a battery voltage, and comparing 134' the measured battery voltage to an expected voltage. Establishing 130' further comprises initiating 136 conditioning when a lower than expected measured battery voltage (i.e., result) is encountered.

A variation of the embodiments that measure battery voltage involves monitoring a voltage or voltage slope during discharge of the battery. Generally, a battery in need of conditioning 120 exhibits more than one voltage plateau during discharge: a first plateau at a first or 'normal' battery voltage and at least a second plateau at a slightly lower voltage. As used here, the normal battery voltage is a voltage produced by a battery that is not in need of conditioning. Conversely, a battery that does not need conditioning 120 exhibits only the normal battery voltage plateau.

Figure 3C:
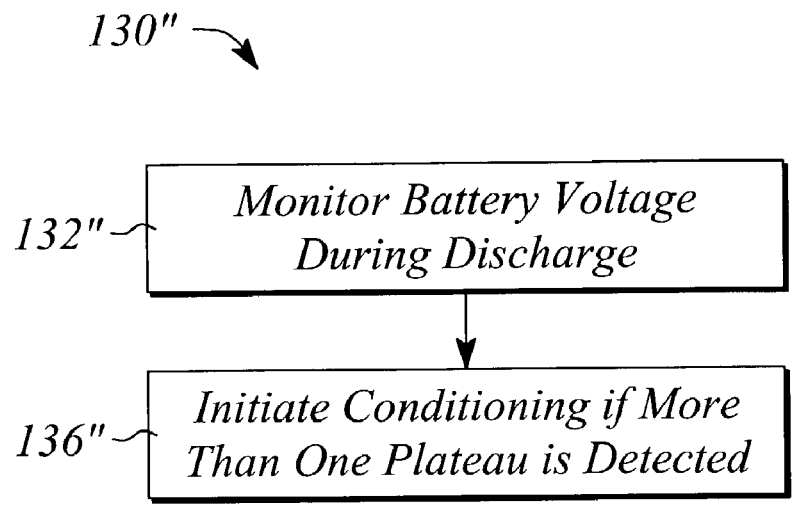
FIG. 3C illustrates a flow chart of another embodiment of establishing when and whether to condition a battery in the method of adaptively conditioning of FIG. 1 according to the present invention.

FIG. 3C illustrates a flow chart of another embodiment of establishing 130" when and whether to condition a battery in the method 100 according to the present invention that employs detection of the second plateau. Accordingly in some embodiments, establishing 130" when and whether to condition comprises monitoring 132", 134" the battery voltage during discharge to detect a presence of the second plateau; and initiating 136" conditioning of the battery upon detection of the second plateau.

Figure 3D:
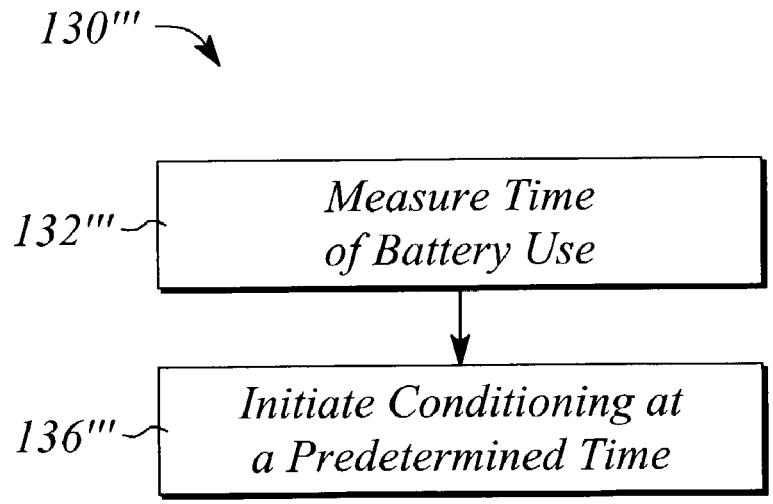
FIG. 3D illustrates a flow chart of another embodiment of establishing when and whether to condition a battery in the method of adaptively conditioning of FIG. 1 according to the present invention.

In devices having a real time clock or a clock capable of tracking elapsed time, conditioning 120 may be performed periodically or after a given period of elapsed time. FIG. 3D illustrates a flow chart of another embodiment of establishing 130''' when and whether to condition a battery in the method 100 according to the present invention that utilizes a measurement of time. In such an embodiment, establishing 130''' comprises measuring 132''' a time interval or an elapsed time; and initiating 136''' conditioning 120 when the time interval equals a predetermined time interval or when the elapsed time equals a predetermined specific time period. The time interval or the elapsed time may be a time period since the battery was last charged, or a period of battery use, a period of battery nonuse, or a combination thereof. For example, NiMH batteries often require conditioning 120 after being stored in or outside of a device for an extended period of time. According to this embodiment, establishing 130''' when and whether to condition comprises measuring 132''' the storage time (e.g., a time since the battery was previous charged). If the storage time approximately equals or exceeds the predetermined time interval, establishing 130''' further comprises initiating 136''' conditioning 120 of the battery when the battery is next charged.

In yet other embodiments (not illustrated), conditioning 120 of a newly installed battery may be desirable. For example as described hereinabove, NiMH batteries generally benefit from undergoing several conditioning cycles when the batteries are new or have been stored for an extended period of time. Thus, establishing 130 when and whether to condition may comprise determining that a new battery has been installed in the device. For example, detecting the presence of a battery with a very low battery voltage (e.g., less than 0.8 Volts per cell) might indicate a new battery has been installed. Similarly, installation of a new battery may be determined by monitoring whether or not the battery compartment has been accessed. Moreover, the battery chemistry determination 110 may indicate that the new battery is a NiMH battery. Under such circumstances, establishing 130 may comprise initiating 136 conditioning 120 when the new battery is first recharged. Moreover according to some embodiments, establishing 130 may initiate 136 a sequence of several conditioning 120 cycles (e.g., 2-4 cycles) to insure that a peak capacity of the new battery is likely to be realized.

In some embodiments (not illustrated), establishing 130 whether and when to condition may further comprise checking whether the battery is a rechargeable battery. In general, a non-rechargeable battery is not to be conditioned or is not reconditionable. Thus, establishing 130 may comprise utilizing the determined 110 battery chemistry and a list of which chemistries are rechargeable to determine whether the battery is to be conditioned or is reconditionable at all. In yet other embodiments, either the method 100 or the device may comprise a conditioning 'lock-out' mode. If the lock-out mode is active, establishing 130 when and whether to condition is prevented from initiating 136 conditioning 120.

In yet other embodiments, the conditioning lock-out mode is automatically activated if it is determined that conditioning 120 has not or may not likely improve the condition of the battery and/or another performance characteristic of the battery. For example, if conditioning 120 is initiated 136 because the battery fails to charge to a voltage indicating a 'full' battery, as described hereinabove, failure to reach the 'full' battery voltage after conditioning 120 may indicate that something other than battery conditioning is responsible for the failure. The method 100 of the present invention advantageously makes such determination according to these embodiments. In such instances, the conditioning lock-out mode is automatically activated. When conditioning lock-out mode is automatically activated, a user may be notified of a potential problem with the battery and or a problem with a device employing the battery. User notification may be achieved in several ways including, but not limited to, an audio notification and/or an alphanumeric or iconic notification displayed on a display of the device. It should be noted that in some embodiments, the conditioning lock-out mode may be manually or semi-automatically activated and still be within the scope of the present invention.

The method 100 of the present invention is applicable to all battery powered electronic devices that employ rechargeable batteries and battery-charging systems for recharging rechargeable batteries, especially those that are capable of accepting and using battery types and form factors available in multiple different battery chemistries. In addition, the method 100 is applicable to electronic devices that can accept either re-chargeable or non-rechargeable battery types. Examples of different battery chemistries available for use in electronic devices include, but are not limited to, alkaline, high drain alkaline, nickel-metal hydride (NiMH), nickel-cadmium (NiCd), and photo lithium (Li—$FeS_2$), all of which are commercially available in a variety of form factors. Examples of battery-powered devices to which the present invention is applicable include, but are not limited to, notebook and laptop computers, hand-held computers and personal digital assistants (PDAs), digital cameras, including video cameras, portable electronic toys, and cellular telephones.

It should be understood by those skilled in the art that the battery-powered devices may use more than one chemistry from the available battery chemistries, however the devices generally use only one of the available chemistries at a time. In other words, if the device uses a quantity of two 'AA' batteries for battery-powered operation, the two 'AA' batteries are the same chemistry when used in the device. In battery-powered devices that allow for using batteries having different chemistries for operation, it is within the scope of the present invention to determine 110 the chemistry of each installed battery and implement battery conditioning 120 to each battery according to the determined 110 chemistry, as described above.

Figure 4:
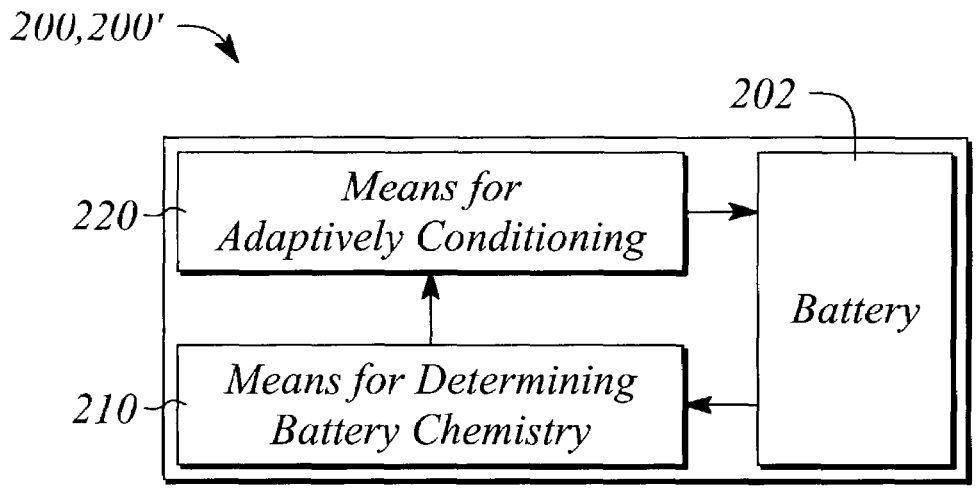
FIG. 4 illustrates a block diagram of an embodiment of a device that adaptively conditions a battery according to the present invention.

In another aspect of the present invention, a device 200 that adaptively conditions a battery is provided. FIG. 4 illustrates a block diagram an embodiment of the device 200 that adaptively conditions a battery according to the present invention based on battery chemistry determination. The device 200 comprises means for determining battery chemistry 210 of a battery 202 associated with the device 200. The means for determining 210 battery chemistry measures a characteristic of the battery 202 and determines a chemistry of the battery 202 from the measured characteristic.

The device 200 further comprises means for adaptively conditioning 220 the battery 202. The means for adaptively conditioning 220 adapts to the determined chemistry of the battery 202 before conditioning and then conditions the battery 202 accordingly.

In some embodiments, the means 210 for determining battery chemistry comprises means for monitoring a battery or a battery monitor. The battery monitor measures a characteristic of the battery 202, such as a voltage or a current of the battery 202. The measured characteristic is compared to expected values of the characteristic for a plurality of battery chemistries to determine a chemistry of the battery 202. For example, the battery monitor may employ any of the methods of determining 110 battery chemistry described hereinabove with respect to the method 100. The determined chemistry is then communicated to the means 220 for adaptively conditioning the battery.

In some embodiments, the means for adaptively conditioning 220 the battery 202 comprises a load, such as a resistor, a switch and a control circuit. The control circuit controls the switch to connect the battery to the load or to disconnect the battery from the load. When connected to the load, the battery 202 discharges through the load to condition the battery 202. The control circuit employs the determined battery chemistry to adapt the control of the switch to the determined chemistry. In other embodiments, several loads may be selectively switched to and from the battery under the control of the control circuit in response to the determined battery chemistry. In yet other embodiments, the load may be provided by operational circuitry of the device 200, preferably when the device 200 is operating in a low power mode.

Moreover, the means for adaptively conditioning 220 further comprises means for establishing when and whether to condition the battery. In particular, any of the methods of adapting battery conditioning 120 may be employed by the means for adaptively conditioning 220 and further, any of the methods of establishing when and whether to condition 130, 130', 130", 130''' described hereinabove with respect to the method 100 may be employed by the establishing means during adaptively conditioning 120.

Consider for example, an exemplary embodiment of the device 200 in the form of an electronic device 200, such as a digital camera, that provides in situ battery chemistry adaptive battery conditioning of the battery 202 according to the present invention. In particular, the battery 202 employed in the exemplary device 200 may have a chemistry representing any one of a number of rechargeable or non-rechargeable battery chemistries. Also the exemplary device 200 may provide a means for recharging the battery 202 while the battery 202 is installed in the device 200.

Figure 5:
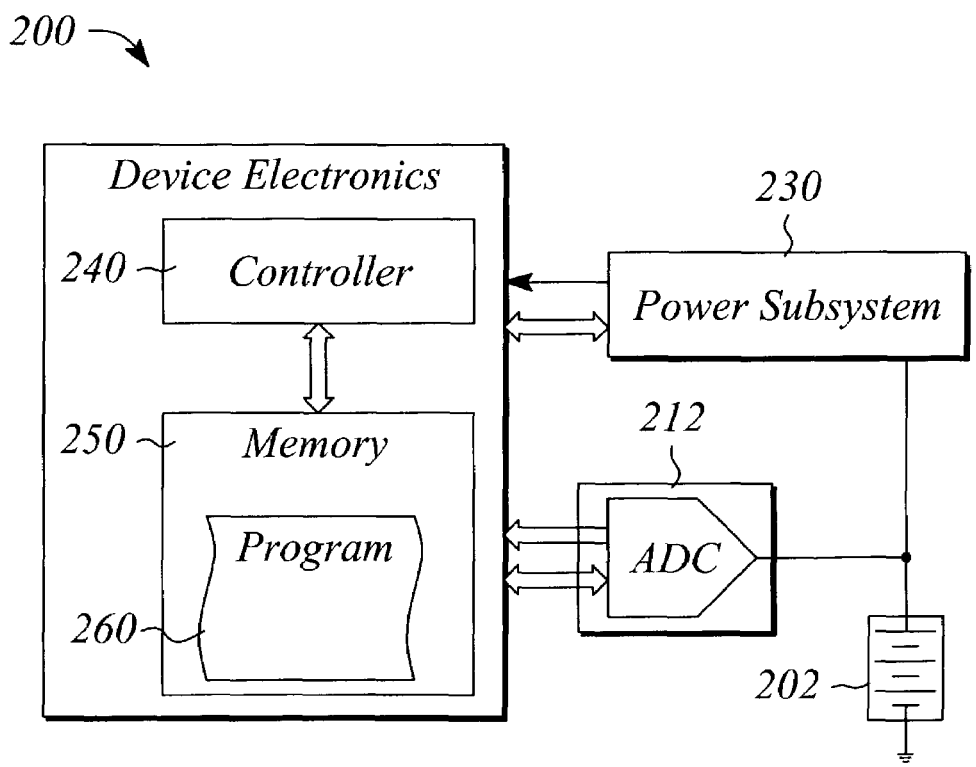
FIG. 5 illustrates a block diagram of an exemplary embodiment of an electronic device that provides in situ adaptive battery conditioning according to the present invention.

FIG. 5 illustrates a block diagram of the exemplary embodiment of the electronic device 200 that provides in situ adaptive battery conditioning according to the present invention. As illustrated in FIG. 5, the exemplary electronic device 200 further comprises a battery monitor 212, a power subsystem 230, a controller 240, a memory or memory subsystem 250, and a computer program 260 stored in the memory subsystem 250. The means for determining 210 battery chemistry of the exemplary electronic device 200 comprises the aforementioned battery monitor 212, the controller 240, and a battery chemistry determining portion of the computer program 260. The means for adaptively conditioning 220 comprises the power subsystem 230, the controller 240, and an adaptive battery-conditioning portion of the computer program 260. In some embodiments, the adaptive battery-conditioning portion of the computer program 260 comprises an establishing when and whether to condition program subportion.

The battery monitor 212 measures a characteristic of the battery 202, such as voltage and/or current, and communicates the measurement to the controller 240. The battery chemistry-determining portion of the computer program 260 comprises instructions that, when executed by the controller 240, determine the battery chemistry of the battery 202. For example, the instructions may implement any one of the methods 110 of battery chemistry determination previously described hereinabove with respect to method 100. The controller 240 executes the instructions that may include retrieving data from the memory subsystem 250. The retrieved data contain a list to which the measured characteristic is compared. The result of the executed instructions by the controller 240 is a determination of the battery chemistry of the battery 202.

The power subsystem 230 is controlled by the controller 240. Under control of the controller 240, the power subsystem 230 may discharge the battery 202 as well as recharge the battery 202. In particular, the power subsystem 230, through a connection to an external power source, such as an alternating current (AC) adapter, provides means for charging or recharging the battery 202. Likewise, the power subsystem 230 provides a means for discharging the battery 202 either by providing operational power to the device 200 or by switching an output of the battery 202 to a load resistor.

The battery-conditioning portion of the computer program 260 comprises instructions that, when executed by the controller 240, adaptively condition the battery 202 based on the determined chemistry. For example, the instructions may implement any one of the methods 120 of conditioning described hereinabove with respect to the method 100. Moreover, the instruction may implement a method of establishing when and whether to condition including, but not limited to, any of the embodiments of establishing 130, 130', 130", 130'" previously described hereinabove with respect to method 100. The result of the execution of the instructions by the controller 240 is the adaptive conditioning of the battery 202 in situ within the device 200.

Referring back to FIG. 4, the device 200 may be a battery charging and conditioning system 200', that is either independent of or associated with a battery-powered device. The battery charging and conditioning system 200' accepts a battery 202 for recharging and conditioning. If the system 200' determines that the battery chemistry is not a rechargeable chemistry, the system 200' will not attempt to condition the battery. The system 200' recharges and conditions a battery representing any one of several rechargeable chemistries. As described above for the device 200, the battery recharging and conditioning system 200' comprises means for determining 210 battery chemistry and means for conditioning 220 the battery. The battery recharging and conditioning system 200' determines a chemistry of the battery 202 and if the battery 202 is determined to be rechargeable, the system 200' then adaptively conditions the battery 202 based on the determined chemistry of the rechargeable battery. After conditioning the battery 202, the battery 202 is further charged in the system 200'. The battery 202, having been adaptively conditioned and charged in accordance with the present invention, is ready for use in a battery-powered device.

Thus, there have been described numerous embodiments of a method of adaptively conditioning a battery based on a determined battery chemistry, and a device and a system that adaptively condition a battery. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A method of adaptively conditioning a battery comprising:
   determining a chemistry of the battery from a characteristic of the battery comprising measuring the characteristic under both a battery load condition and a battery unloaded condition; and
   conditioning the battery according to the determined battery chemistry.

2. The method of claim 1, wherein determining a chemistry further comprises:
   comparing the measured characteristic to predetermined battery characteristics for a plurality of battery chemistries.

3. The method of claim 1, wherein determining a chemistry further comprises:
   computing a battery chemistry coefficient from the measured loaded characteristic and the measured unloaded characteristic; and
   comparing the coefficient to either a set of predetermined battery chemistry coefficients or a set of battery chemistry coefficient ranges for candidate battery chemistries.

4. The method of claim 3, wherein comparing the computed battery chemistry coefficient effectively discriminates between the candidate battery chemistries.

5. The method of claim 1, wherein the measured characteristic of the battery is one or both of a battery voltage and a battery current.

6. The method of claim 1, wherein conditioning the battery facilitates one or both of an establishment of a primary charge capacity for the battery and a maintenance of a charge capacity of the battery.

7. The method of claim 1, wherein conditioning the battery comprises:
   discharging the battery to an end-of-discharge condition, the end-of-discharge condition being dependent on the determined battery chemistry; and
   charging the discharged battery.

8. The method of claim 1, further comprising:
   establishing when and whether to condition the battery.

9. The method of claim 8, wherein establishing when and whether to condition the battery comprises establishing one or both that the battery has reached an end-of-discharge condition and that the battery is about to be recharged.

10. The method of claim 8, wherein establishing when and whether to condition the battery comprises:
    monitoring energy output from the battery during operational use of the battery; and
    detecting an energy output from the battery that is indicative of when the battery is to be recharged.

11. The method of claim 8, wherein establishing when and whether to condition the battery comprises:
    measuring an energy output from the battery during operational use of the battery;
    comparing the measured energy output to an expected energy output for the battery; and
    initiating conditioning when the measured energy output is lower than the expected energy output.

12. The method of claim 8, wherein establishing when and whether to condition the battery comprises:
measuring a voltage of the battery;
comparing the measured battery voltage to an expected voltage for the battery; and
initiating battery conditioning when the measured battery voltage is lower than the expected voltage for the battery.

13. The method of claim 8, wherein establishing when and whether to condition the battery comprises:
monitoring a voltage of the battery during one or both of battery charging and battery discharging;
comparing the monitored battery voltage to an expected voltage for the battery for the one or both of battery charging and battery discharging, respectively; and
initiating battery conditioning if the monitored battery voltage fails to reach the expected voltage for the battery.

14. The method of claim 8, wherein establishing when and whether to condition the battery comprises:
monitoring one of a voltage or a voltage slope during discharge of the battery; and
initiating conditioning if the monitored voltage or the monitored voltage slope exhibits more than one voltage plateau during discharge, at least one plateau being less than another plateau.

15. The method of claim 8, wherein establishing when and whether to condition the battery comprises:
measuring a time interval with respect to the battery; and
initiating conditioning when the measured time interval is similar to a predetermined time interval, wherein the measured time interval defines one or more of a time period since the battery was last charged, a time period of battery use, and a time period of battery nonuse.

16. The method of claim 1, wherein the battery chemistry is determined one or more of when the battery is replaced in an electronic device, when the battery is installed in the electronic device, during a power-up sequence of the electronic device in which the battery is installed, and when a compartment of the electronic device that encloses the battery is accessed.

17. The method of claim 16, wherein the battery is conditioned more frequently than the battery chemistry is determined.

18. The method of claim 16, wherein when and whether to condition the battery is established before conditioning the battery, when and whether to condition being established more frequently than the battery chemistry is determined, wherein establishing when and whether to condition utilizes the determined battery chemistry to determine whether the battery is rechargeable.

19. A device having in situ battery chemistry-adapted battery conditioning comprising:
means for determining a chemistry for a battery installed in the device, the battery chemistry determining means measuring a characteristic of the installed battery under both a battery load condition and a battery unloaded condition to determine the battery chemistry; and
means for conditioning the installed battery, the conditioning means adapting to the determined battery chemistry before conditioning.

20. The device of claim 19, wherein the battery chemistry determining means comprises
a battery monitor that measures a value of the battery characteristic, the characteristic being one or both of a voltage of the battery and a current of the battery; and
means for comparing the measured characteristic value to expected values for corresponding characteristics of a plurality of battery chemistries.

21. The device of claim 19, wherein the battery conditioning means comprises:
a load, a switch, and a control circuit, the control circuit controlling the switch to one or both of connect the battery to the load and disconnect the battery from the load, the control circuit adapting to the determined battery chemistry to control the switch.

22. The device of claim 19, wherein the battery conditioning means comprises means for establishing when and whether to condition the battery, the establishing means optionally comprising one or both of means for battery monitoring and a clock, the battery monitoring means measuring one or both of energy output of the battery and voltage of the battery, the clock measuring a time interval with respect to the battery.

23. The device of claim 19, wherein the device further comprises a lock-out mode that prevents either or both of conditioning and recharging of a battery that has a determined nonrechargeable battery chemistry.

24. A battery charging and conditioning system that accepts any one of a plurality of rechargeable battery chemistries comprising:
means for determining a battery chemistry of a battery installed in the system, the battery chemistry determining means measuring a characteristic of the installed battery under both a battery load condition and a battery unloaded condition to determine the battery chemistry; and
means for conditioning the installed battery, the conditioning means adapting to the determined battery chemistry before conditioning.

25. The battery charging and conditioning system of claim 24, further comprising means for charging the battery.

26. The battery charging and conditioning system of claim 24, wherein the conditioning means comprises means for charging the installed battery and means for discharging the installed battery.

27. An electronic device with in situ adaptive battery conditioning comprising:
a battery monitor that measures a characteristic of an installed battery;
a power subsystem that powers the electronic device using the installed battery, the power subsystem providing for discharging the battery;
a memory subsystem;
a controller that controls the battery monitor, the power subsystem, and the memory subsystem; and
a computer program stored in the memory subsystem, the computer program having instructions that, when executed by the controller, implement determining a battery chemistry from a characteristic of the installed battery, the characteristic being measured under a battery load condition and a battery unloaded condition, and adaptive conditioning of the installed battery according to the determined battery chemistry,
wherein the electronic device accepts any one of a plurality of battery chemistries.

28. The electronic device of claim 27, wherein the instructions that implement determining the battery chemistry comprise instructions that implement using the battery monitor to measure the characteristic of the installed battery under the battery load condition and the battery unloaded condition, and instructions that implement comparing the measured characteristic to predetermined characteristics for the plurality of battery chemistries to determine the chemistry of the installed battery.

29. The electronic device of claim 28, wherein the instructions that implement comparing the measured characteristic comprise instructions that implement computing a battery chemistry coefficient from the measured loaded characteristic and the measured unloaded characteristic, and comparing the coefficient to either a set of predetermined battery chemistry coefficients or a set of battery chemistry coefficient ranges for plurality of battery chemistries.

30. The electronic device of claim 27, wherein the power subsystem comprises:
   a load, a switch, and a control circuit, the control circuit controlling the switch to one or both of connect and disconnect the battery from the load to condition the battery, wherein control of the switch is adapted to a determined battery chemistry by execution of the instructions that implement the adaptive conditioning.

31. The electronic device of claim 27, wherein the instructions that implement the adaptive battery conditioning further comprise instructions that implement establishing when and whether to condition.

32. The electronic device of claim 31, wherein the instructions that implement establishing when and whether to condition comprise:
   instructions that implement measuring a value of one or both of an energy output of the battery and a voltage of the battery;
   instructions that implement comparing the measured value to a respective expected value for the determined battery chemistry; and
   instructions that implement initiating conditioning if the measured value is lower than the respective expected value,
   wherein the instructions that implement measuring measure the value during one or more of operational use of the device, battery charging, and battery discharging.

33. The electronic device of claim 31, wherein the instructions that implement establishing when and whether to condition comprise:
   instructions that either implement monitoring a battery voltage during discharge or implement measuring a time interval; and
   instructions that implement initiating conditioning when respectively either the monitored voltage exhibits more than one plateau or a predetermined time interval for the determined chemistry is reached.

34. The electronic device of claim 31, wherein the instructions that implement establishing when and whether to condition comprise:
   instructions that implement measuring a time interval with respect to the battery; and
   instructions that implement initiating conditioning when the measured time interval is similar to a predetermined time interval,
   wherein the measured time interval defines one or more of a time period since the battery was last charged, a time period of battery use, and a time period of battery nonuse.

35. The electronic device of claim 27, wherein the computer program further comprises instructions that implement a lock-out mode that prevents either or both of conditioning and recharging the installed battery when the determined chemistry is a nonrechargeable battery chemistry.

36. The electronic device of claim 27, wherein the electronic device is selected from a notebook computer, a laptop computer, a hand-held computer, a personal digital assistant (PDA), a digital camera, a digital video camera, a portable electronic toy, and a cellular telephone.

37. The electronic device of claim 27, wherein the electronic device is a battery charging and conditioning system, the system conditioning and recharging the installed battery when the determined chemistry is a rechargeable battery chemistry, and
   wherein the computer program further comprises instructions that implement a lock-out mode that prevents either or both of conditioning and recharging of the installed battery when the determined chemistry is a nonrechargeable battery chemistry.

* * * * *